United States Patent Office 2,753,835
Patented July 10, 1956

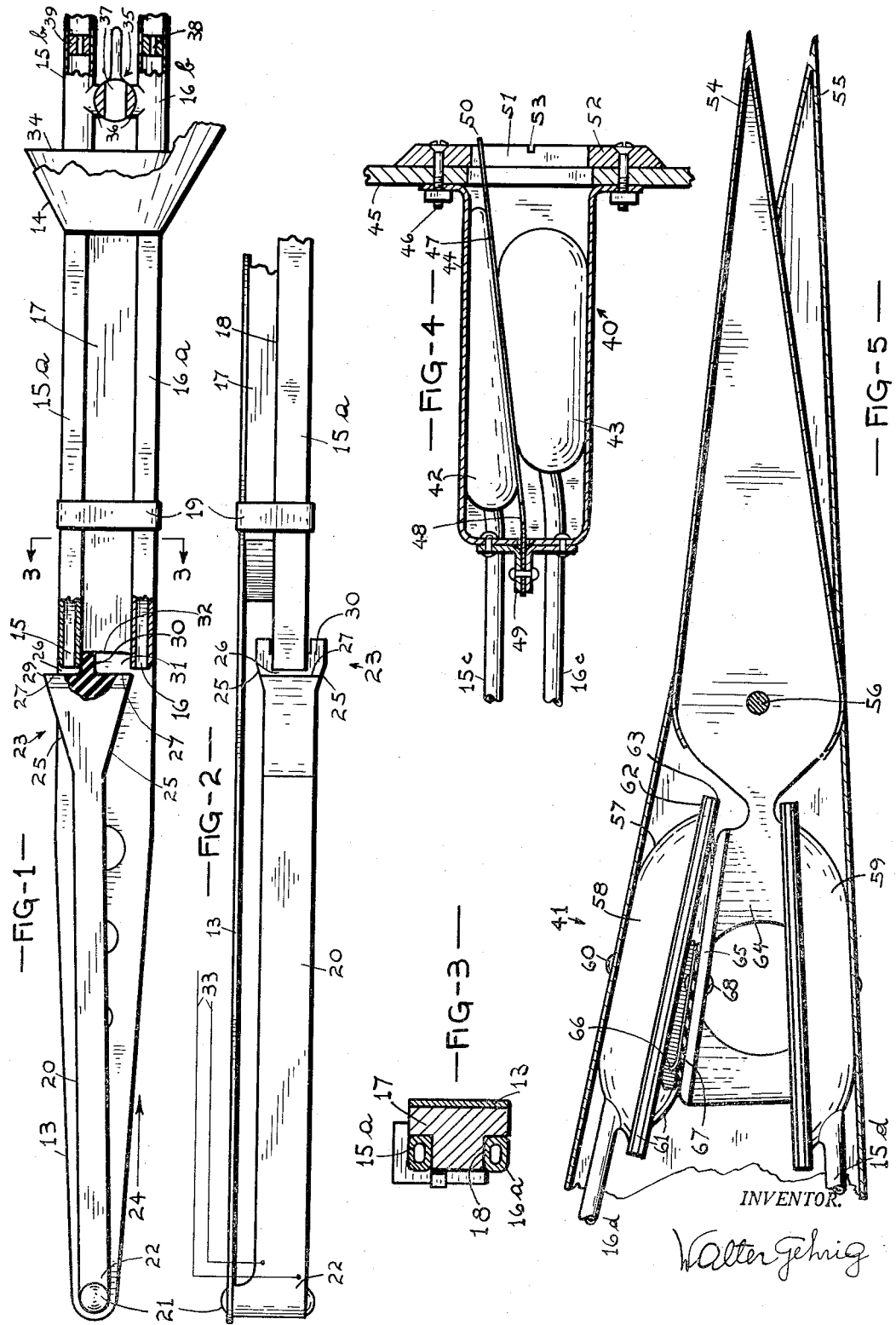

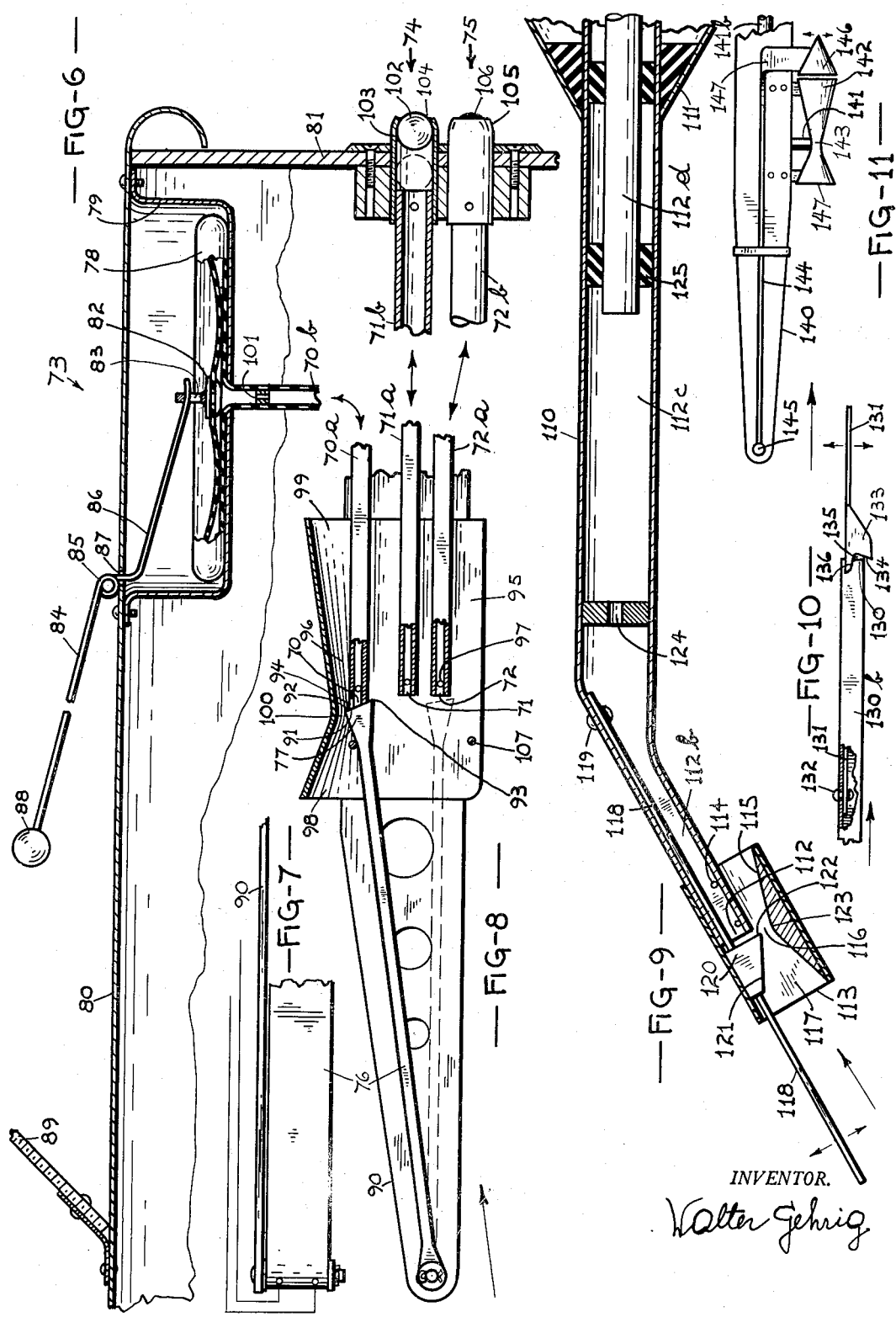

2,753,835

ANGLE OF ATTACK GOVERNED AIRCRAFT APPARATUS

Walter Gehrig, Flint, Mich.

Application April 3, 1952, Serial No. 280,237

24 Claims. (Cl. 116—124)

The present invention relates to angle of attack governed aircraft apparatus. Positive and negative air pressure is induced in a single conduit at one open conduit end by the airstream flowing about the aircraft during flight. The pressure reversal is controlled by a combined valve and pressure reverser coupled to and oscillable with a vane responsive to the airstream's angle of attack. Positive pressure is induced in the conduit when the open conduit end is exposed to the airstream. The pressure in the same conduit is reversed to suction or negative pressure when the open conduit end is shieldingly covered by the pressure reverser. In this position a zone of negative pressure induced by the airstream at the lee-side of the pressure reverser is in fluid connection with said open conduit end. The airflow reversal and fluid pressure reversal in the conduit can be used to indicate when the airstream is within or has passed a selected angle of attack. The airstream induced motive power in the conduit can also be used to automatically operate a control surface or any other member and apparatus on the aircraft controlled by said coupled vane and pressure reverser. The described device provides an airstream induced dual power supply controlled by a single vane and coupled pressure reverser. It is outstanding by its simplicity. The two way motive power is induced by the airstream at one single conduit opening in one single conduit.

The described device can be used on any type of aircraft. At present it is especially well suited for airplanes. In certain flight maneuvers of airplanes, such as take-offs and landings, it is desirable to increase the angle of attack of the aircraft wing with respect to the airstream so as to obtain maximum lift. For every airfoil or wing there is a particular maximum angle of attack past which the wing loses lift rapidly, often causing an accident. This flight condition is known as a "stall." The described angle of attack controlled device can be used to warn the pilot when such an aircraft attitude is approached. Furthermore, the airstream induced motive power and the described control means combined with an air-motor can be used to automatically move a control surface of the aircraft to prevent such "stalls."

On long distance flights the cruising attitude of an aircraft affects the fuel consumption and consequently the flight range. For example, a symmetrical streamlined fuselage offers the lowest air resistance when its longitudinal centerline is positioned in line with the direction of travel and direction of the airstream. A nose high, tail low attitude, or vice versa, causes increased drag, lower speed and higher fuel consumption. On long distance flights of airliners, bombers, etc., the gradual consumption of large amounts of fuel causes a gradual change of weight distribution and a corresponding change of the aircraft's flight attitude unless the aircraft is repeatedly "trimmed." The hereafter described angle of attack governed apparatus makes maximum flight efficiency possible.

For purpose of illustration the invention is described for indicating the angle of attack relative to the airfoil of an airplane. The illustrated control device however can also be installed in a position rotated ninety degrees to indicate the angle of attack relative to the span of an aircraft, known as yaw. Furthermore, two pairs of control conduits for both above said flight conditions can be installed as a single unit, controlled by a single vane and pressure reverser-valve pivotally mounted to swing over four crosswise arranged conduit openings. A rotary air-motor or air-turbine can also be used in place of the illustrated reciprocating air-motor, without departing from the scope of the invention.

An object of the present invention is to provide simple, low cost, dependable control means for any angle of attack governed airflow operated aircraft apparatus.

Another object is to provide a dependable low cost angle of attack governed source of two way motive power for the operation of an aircraft apparatus.

A further object is to provide a simple reliable device which indicates when an aircraft's attitude is within a selected angle of attack most efficient for cruising.

Another object of the present invention is to combine a fluid pressure generator and a control means for the motive fluid pressure in a simple combined design.

Another object is to provide automatic means for the control and operation of an aircraft's control surface to automatically "trim" the aircraft for most efficient cruising attitude or to limit the maximum angle of attack to prevent a "stall."

Still another object is to provide a simple power booster to increase the airstream induced motive power at slow flying speed for operation of an airflow operated aircraft apparatus.

The above and other objects and advantages of the invention will appear more fully hereinafter from a consideration of the detailed description which follows, taken together with the accompanying drawings wherein only some embodiments of the invention are illustrated. It is to be understood that the drawings are for the purpose of illustration only and are not intended to define the limits of the invention.

In the drawings, wherein like reference characters refer to like parts:

Figure 1 is a side view of a motive power generator and of the control means for conduits and a fluid connected apparatus responsive to the airstream's angle of attack. Conduit portions and a reverser portion are shown in section.

Figure 2 is a top view of the same control means as shown in Figure 1.

Figure 3 is a cross section through the above said control means, taken as indicated by lines and arrows 3—3 in Figure 1.

Figure 4 indicates an angle of attack indicating device responsive to airflow and pressure difference in the fluid connected conduits controlled by above said control means. The housing is shown in section.

Figure 5 illustrates an aircraft's control surfaces automatically controlled and operated by a fluid motor responsive to pressure changes in the connected conduits, controlled by the above said control means. The "skin" of the control surfaces and part of the fluid motor is shown in section.

Figures 6 to 11 illustrate modified embodiments of the same invention.

Figure 6 is a longitudinal section through a cabin portion of an aircraft. The indicating ends of a stall warner and an angle of attack indicator are illustrated, parts thereof in section.

Figure 7 is top view of a support structure and control vane pivotally mounted thereto.

Figure 8 illustrates the power generator and the control means for the air pressure operated indicators shown in Figure 6. Conduit portions and a venturi-duct are shown in longitudinal section.

Figure 9 is a longitudinal section of the fluid pressure generator and control means for a two way airflow operating a stall warner or other apparatus.

Figure 10 illustrates a modified embodiment of the power generator and control means shown in Figure 1 but positioned in opposite direction relative to the airstream.

Figure 11 illustrates a venturi-duct opened and shut by a pressure reverser coupled to a vane.

Referring in detail to the drawings, the numeral 13 in Figures 1 and 2 indicates a support structure, such as a stiff metal blade, fixed to an aircraft at the nose of the fuselage 14. The support structure may also be secured to any other suitable part of an aircraft, as for example the leading edge of a wing. The support structure preferably projects from the aircraft into the undisturbed airstream. Two conduit portions 15a, 16a are rigidly mounted to the support structure and are vertically spaced by an interposed spacer 17 of wood or any other suitable material. This spacer fits along and forms part of the support structure 13. Longitudinal notches or beds 18 fit two sides of the rectangular conduits as illustrated. The spacer and conduits are secured to the support structure by means of a band 19 tightly encircling the assembly. The spacer 17 also holds the conduits some distance away from the blade 13. One end 15, 16 of each conduit opens toward the airstream flowing about the aircraft during flight. A vane 20 is pivotally mounted to the leading end of the support structure 13 by means of a pivot mounting comprising a horizontal pivot pin 21 fixed to the support blade 13. A hole (not shown) in the pivot-end 22 of the vane slip fits over said pivot pin. The middle portion of the vane 20 forms an oscillable vane blade positioned within the airstream and normally in horizontal position. The other vane end forms into a pressure reverser 23 adapted to reverse the fluid pressure at the conduit orifices 15, 16 and in the fluid connected conduits and apparatus. This pressure reverser 23 coupled to and oscillable with the vane 20 is adapted to shieldingly cover both or either one of the two open conduit orifices 15, 16. The body of the pressure reverser is bigger than either conduit-orifice and forms a valve in combination with the open conduit ends controlling the airflow and air pressure therein. When a conduit-orifice is uncovered it is exposed to the positive pressure induced by the oncoming airstream 24 and consequently positive fluid pressure is also induced in any fluid connected pressure responsive air motor or apparatus. Air deflector faces 25 forming part of the pressure reverser 23 are exposed to the airstream. A suction recess 26 is formed adjacent the pressure induction face 27 on the lee-side of the pressure reverser and this pressure induction face is adapted to pass in front of the open conduit-orifices 15, 16 to shieldingly cover and uncover them to the airstream as illustrated in Figure 1. The suction induction face 27 of the pressure reverser does not close the covered conduit orifice, an air passage way 26 is provided by clearance distance between the lee-side of the pressure reverser and the shielded conduit orifice. During flight the airstream flows over the tapered diverging outer sides of the pressure reverser 23 at a high rate of speed. When air of this airstream passes the protruding corner 29 adjacent the lee-side of the pressure reverser it sucks air along and out of the adjacent suction recess 26 formed by a cavity 26 at the lee-side 27 of the pressure reverser. Negative air pressure and suction is thus induced by the airstream in the zone adjacent the pressure induction face 27. The conduit orifice 15 is positioned within this zone of negative fluid pressure when covered and shielded by the pressure reverser. Negative pressure also is induced in the conduit 15a and any fluid connected apparatus. An airflow barrier 30 is interposed between the two reversed pressure zones in front of the open conduit ends 15, 16 to prevent pressure bleeding between zones. For this purpose a transverse recess 31 is provided between conduit ends. The curved front face 32 of the spacer is equi distant from the vane pivot pin 21. An extension 30 of the pressure reverser extends into this recess as shown in Figure 1. The end of this reverser portion 30 slip fits the curved front end of the spacer and so forms a pressure zone separator as within the leeside of the reverser no air can flow from the positive zone to the negative zone. The combined zone separator and airflow barrier protrudes along the sides of the spacer and forms a guide limiting the side play of the reverser and vane, the oscillation thereof is limited by contact of the zone separator 30 with the projecting conduit ends 15, 16. In the illustrated form of construction the vane 20 and pressure reverser 23 is made of a single molded piece having electrical conduits embedded therein connected with an electrical power supply by conduit wires 33. When atmospheric conditions tend to form ice on the aircraft then the vane and pressure reverser can be electrically heated to prevent ice formation thereon. The spacer adjacent the conduit ends could also be provided with similar heating means. The back ends of the rectangular conduits 15a, 16a and spacer 17 are rigidly embedded in a body 34 of rubber or other suitable material. This assembly body also embeds, holds, aligns and fluid connects the ends of round flexible conduits 15b, 16b with the rectangular conduits 15a, 16a.

A manually operated valve 35 located in the crew compartment of the aircraft has an open and a closed position. When in open position it is adapted to fluid connect the two control conduits 15b, 16b with each other through fluid connected conduit portions 36, and aligned valve conduit 37. The fluid passage capacity of each conduit 15, 16 is limited by a small metering orifice 38 forming a short portion of the conduit. It may consist of a conduit insert 39 having a small fluid passage hole 38. Each control conduit 15, 16 is fluid connected to fluid motors 40, 41 through two pairs of conduit branches 15c, 16c, 15d, 16d. Both fluid motors are responsive to pressure changes and pressure reversal in the connected conduits and responsive to pressure difference between the two control conduits. The embodiment illustrated in Figure 4 comprises two flexible expansible and contractible fluid chambers 42, 43 in the form of bladders enclosed in a housing 44 secured to the instrument board 45 of the aircraft by means of screws 46. A connector 47 is operatively connected with the motive portion of each chamber. Said connector consists of a flat plate or sheet interposed between the two flexible chambers for moving therewith. It consists of resilient spring material, such as hard aluminum or plastic, having a tendency to return to original straight form when bent. One end portion thereof forms into a comparatively narrow spring strip 48 the end portion of which is rigidly held in a bracket 49 fixed to the housing. The other end of the connector forms an indicating finger 50 extending through a vertical slot 51 in a face plate 52 aligned with the housing and also secured to the instrument board. A small horizontal slot 53 in the face plate is located at the halfway mark relative to the maximum travel of the finger 50.

Illustrated in Figure 5 is a similar fluid motor 41 operatively connected with a "trim-tab" 54 of an aircraft control surface 55 such as an airplane elevator. The trim tab is pivotally mounted to the control elevator near the trailing edge by means of a pivot rod 56. Each flexible expansible and contractible fluid chamber 58, 59 comprises a rigid dish-like member 57 fixed to the elevator 55 with rivets 60. A flexible chamber portion 61 of rubber or other suitable material is air-tightly secured to a rim 62 on the rigid chamber portion by means of a ring 63 and countersunk screws (not shown). A conduit 15d, 16d is fluid connected to each chamber. A connector 64 forms a rigid pivotal extension of the trim tab 54 and has two plates 65 each contacting one of the flexible fluid chambers on opposite sides. A backing plate 66 presses an interposed flexible portion 67 of the fluid chamber against the paired connector plate 65. The backing plate, the interposed flexible chamber-wall and the connector are secured to each other with a rivet 68.

Operation

The control device is rigidly mounted to an aircraft in a position so that the oscillable vane 20 and coupled pressure reverser 23 is in neutral and central position when the aircraft is in the most efficient attitude described before. In this neutral position the top and bottom corners of the reverser are about flush with the top and bottom edges of the conduits 15, 16. The oscillable vane portion is aligned with the airstream and locates the pressure reverser in above said central position in which the pressure reverser shieldingly covers both conduit orifices equally. Slight equal negative air pressure is induced in both conduits. The consequent balanced pressure in the two fluid chambers 42, 43, 58, 59 causes no motive action of the fluid motors. For purpose of illustration the invention is hereafter described as installed on an airplane. If the airplane during cruising flight assumes a "tail heavy" "nose high" attitude due to a change in the weight distribution, then the corresponding slight change of the airstream's angle of attack will also change the position of the oscillable vane. The lower corner of the pressure reverser 23 will raise and uncover the lower conduit orifice 16 to the positive pressure of the oncoming airstream. The upper corner 29 at the same time will raise and protrude above the upper conduit end 15. In Figure 1 of the drawing the vane and reverser is shown in maximum "up" position for purpose of illustration. In this limit position maximum suction is induced in the upper conduit 15. Maximum positive pressure is at the same time induced in the lower conduit 16 which is fully exposed to the airstream. Maximum fluid pressure difference therefore exists between the two paired fluid chambers, one 42, 59 being contracted by the negative pressure, the other 43, 58 being expanded by the positive pressure. The operatively connected trim tab 54 in turn is raised as illustrated in Figure 5. In this position the airstream flowing over the skin of the bigger control elevator 55 is deflected when reaching the tab 54, causing positive down pressure on top of the tab and suction on the bottom face thereof. The downward pressure exerted by the airstream on the tab effects the oscillable trailing end of the longer control surface 55 to move downward thus raising the airplane's tail end. This attitude change is very slow due to the metered small air passage capacity of the conduits. This attitude change will stop when the motive fluid pressure induced by the airstream at the conduit openings 15, 16 reaches a point where it balances the back pressure from the raised trim tab. The airplane automatically holds this pressure balanced attitude during which the vane and pressure reverser is located in a slight off center position determined by the back pressure of the trim tab. The position and back pressure of the tab is determined by the tail heavy weight distribution. The amount of "tail-heaviness" and corresponding compensating position of the control surface corresponds with the position of the tab, the pressure in the conduits and consequent off center position of the vane and pressure reverser. The trim tab position is indicated by the corresponding position of the indicator finger 50 in the crew compartment. The fluid pressure in the fluid chambers of the tab-motor 41 and indicator-motor 40 are equal as both are fluid connected with the same open conduit orifices 15, 16. The back pressure of the spring blade 48 corresponds with the airstream induced back pressure of the trim tab 54. When the fluid pressure difference indicating finger 50 is considerably off center then the weight distribution on the aircraft is preferably re-adjusted. For example, the aircraft motor can be fluid connected with a different fuel tank. Of course when the aircraft becomes "nose heavy" then the position of the vane, pressure reverser, trim tab, control surface and indicator finger will be reversed in accordance with the reversed fluid pressure, in the conduits and fluid motors, in accordance with the changed angle of attack of the airstream at the vane.

A further reason for the limited metered very low fluid passage capacity of the conduits are the momentary off center positions of the vane caused by air gusts. Fast vane and reverser position changes caused by momentary angle of attack variations come and go before the negligible pressure change in the fluid motors effects a noticeable action.

During aircraft take-offs and landings the described apparatus is preferably neutralized. This can be done by manually turning the valve 35 to open position thus fluid connecting the two conduits 15b, 16b with each other through aligned conduit portions 36 and 37. The air can now pass through the open valve from the positive pressure conduit to the negative pressure conduit and no active fluid pressure is induced in the air motors. Both ends of the leading conduit portion 15a, 16a are thus fluid connected with the atmosphere and fluid pressure in the motor is practically neutralized.

Modified forms

Modified forms of constructions of the same invention are illustrated on the second sheet of the drawings. Similar parts can be recognized and need no repeated detailed descriptions. The airstream direction is indicated by arrows.

Figures 6, 7 and 8 show an apparatus indicating three different aircraft attitudes. The top conduit 70a controls a stall warning indicator and is "on" when the airplane is in maximum safe angle of attack attitude. The central conduit 71a and controlled apparatus is "on" when the airplane is within the most efficient gliding attitude. The bottom conduit 72a and connected apparatus is "on" when the airplane is within the most efficient cruising attitude. All three angle of attack governed apparatus 73, 74, 75 are controlled by a single vane 76 and pressure reverser 77. All three conduit orifices 70, 71, 72 are positioned and spaced within the oscillation range of the vane and coupled pressure reverser corresponding to the angle of attack range of the airplane. Each conduit orifice is adapted to be separately shieldingly covered by the pressure reverser. The aircraft apparatus is responsive to the reversed pressure in the one conduit which is shieldingly covered by the pressure reverser.

The stall warner 73 comprises a flexible expansible and contractible air chamber 78 enclosed in a housing 79 mounted to an airplane cowling 80 behind the instrument board 81. The free upper motive portion of the chamber has a connector 82 secured thereto as shown. The outside portion of the connector has a slot 83. A signalling arm 84 of spring wire or other suitable material forms a small fulcrum coil 85 in the middle portion thereof. The coil rests pivotally on top of the cowl and an adjacent lever portion 86 passes through a small hole 87 in the cowl. The end portion of this lever 86 passes through the slot 83 in the connector. The wire portion on the other side of the fulcrum coil forms a signalling arm 84 having a luminous ball 88 on the end thereof. When in "on" or "up" position this ball is positioned within the pilot's line of forward vision through the windshield 89. The flexible air motor 78 is fluid connected with a conduit 70b, 70a, the other end 70 of which opens towards the airstream when uncovered. A vane 76 is pivotally mounted to a support structure 90. A pressure reverser 77 on the oscillable vane end has a slanted back end 91 fitting the slanted open end 70 of the stall conduit as shown in the drawing. When the airplane reaches maximum safe angle of attack attitude then the vane 76 and pressure reverser 77 is in the position as illustrated. In this position the pressure reverser closes the front end of the stall conduit. The receding end and suction face 91 of the pressure reverser forms corners 92, 93 protruding on top and bottom of the conduit end 70. On the top side of the conduit end a small suction opening and air-passageway 94 is provided, fluid connecting the atmosphere with the inside of the conduit 70. The sides of all three open conduit ends 70, 71, 72 are secured to extended side walls 95 of a venturi duct 96 with small rivets 97. Most stall accidents occur below safe flying speed. Some light planes today can fly safely at airspeeds of about forty miles per hour. To provide adequate airstream induced motive power at low flying speed a power booster in the form of a venturi duct 96 is added to the pressure reverser 77 and stall conduit 70. The positive air pressure at the large front opening 98 and the suction at the large back opening 99 of the venturi duct cause accelerated air speed in the narrow venturi throat 100. In the described invention this accelerated airspeed is used to induce lower negative pressure in the conduit. The sides of the vane 76 and pressure reverser 77 slip fit between the extended side walls 95 of the venturi duct. The top face of the vane and pressure reverser therefore form part of the tapered front opening of the venturi duct when in stall position as illustrated. The top corner 92 of the receding back face on the pressure reverser protrudes above the top of the contacted conduit 70. The protruding portion of the back face 91 forms a pressure induction face and a suction recess 92 positioned in the throat 100 of the venturi duct. The suction orifice 94 in the conduit top is located adjacent and behind this protruding portion 92 of the pressure reverser. The air passing through the venturi throat past the protruding corner at an accelerated rate of speed effects suction in the zone located at the lee-side of the pressure reverser adjacent said suction recess and pressure induction face 92. The conduit opening 94 is positioned within this zone of negative pressure when shieldingly covered by the pressure reverser 77. The resultant suction in the conduit 70a, 70b contracts the flexible chamber 78 and raises the ball end of the signal rod 84. When the angle of attack decreases then the pressure reverser uncovers the open conduit end to the oncoming airstream and the air bladder is inflated what in turn lowers the signal rod until it rests on top of the cowl. Momentary air gust induced pressure changes do not raise the signal rod because the air-metering orifice 101 in the conduit limits the rate of contraction of the bladder 78. Furthermore the inflated bladder, during normal flight, presses the lower end of the connector slot 83 against the inserted end of the signal lever. Before contraction of the bladder can effect a signal the connector 82 has to travel the lost motion length of the slot 83. Air gusts therefore come and go before the upper end of the contractor-slot contacts the upper side of the signal lever 86 to pull it down.

The open conduit ends 71, 72 of the two other conduits are located in positions wherein the back end 93 of the oscillating reverser just clears them. When the pressure reverser shieldingly covers the open conduit end 71 then the movable apparatus member 102 in the form of a light weight ball is sucked into the position indicated by the dotted line. When this conduit orifice 71 is uncovered and exposed to the airstream, then the pressure change in the conduit 71a, 71b from negative to positive pressure moves the ball 102 in the opposite direction into the other one of the two limit positions as illustrated by the solid line. In this position the ball is visible to crew members. The ball slip fits a tubular air chamber 103 having a reduced opening 104 on the free end facing the aircraft crew. Two such tubular chambers 103, 105, each containing a ball 102, 106 are secured to the instrument board 81 as illustrated. Negative pressure in the lowest conduit 72a, 72b sucks the ball 106 in the lower chamber out of sight to the aircraft crew when the pressure reverser 77 shieldingly covers its open conduit end 72 and so indicates that the airplane is within the most efficient cruising attitude. A pin 107 across the lower ends of the venturi walls supports the back end of the vane when at rest. Of course more conduits could be added to indicate other vane and reverser positions and corresponding angles of attack.

Figure 9 illustrates a modified control means well suited to control a stall warner or a fluid motor operatively connected with a control surface of an airplane for automatic stall prevention. In the illustrated embodiment of the invention a round tube 110 is fixed to the leading end of an aircraft part 111 to provide a combined support structure and conduit. A front portion is formed into a rectangular tube 112b positioned within and generally in line with the airstream flowing about the aircraft when the latter approaches stall attitude during flight. A short rectangular tube 113 fits over the sides and top of the rectangular conduit 112b and the two are fixed together by rivets 114. An insert 115 in the bottom of the short tube raises from the lower tube ends to form the throat 116 of a venturi duct 117 adjacent the conduit opening 112. A flat vane 118 is loosely and pivotally secured to the inside of the conduit with a shoulder rivet 119 as illustrated. The other end of the vane blade 118 projects from the open conduit end 112 into the undisturbed airstream. A tapered wedge shaped pressure reverser 120 is secured to the vane blade adjacent the open conduit end. The sides of the reverser 120 slip fit the sides of the venturi duct 117. When open, the slanted face 121 of the reverser together with the front portion of the venturi duct forms a V-shaped mouth 117 facing the airstream. The protruding back end 122 of the reverser forms a valve oscillable with the coupled vane adapted to contact the opposite valve seat 123 formed by a throat portion to open and shut the venturi duct, to free and obstruct air passage, in accordance with the airstream's angle of attack. As is well known negative pressure is induced by the accelerated airflow in a venturi throat. When the vane and coupled pressure reverser is in "venturi air passage open" position as shown, then the conduit end 112 opening into the venturi throat 116 is in fluid connection with the negative pressure zone therein. When the vane and coupled pressure reverser is in "venturi air passage obstructed" position then the airstream flowing against the open mouth 117 of the shut venturi duct causes positive pressure therein. The open conduit end 112 then is in fluid connection with the positive air pressure in the venturi duct 117 through the fluid passage-way opened above the lowered vane blade and pressure reverser. Air can pass on each side of the blade 118 behind the reverser 120. A fluid passage metering orifice 124 is also interposed in the conduit. A flexible conduit extension 112d is airtightly inserted in the back portion of the large round conduit portion 112c by means of rubber rings 125. The unstable vane 118 quickly changes from "venturi fully open" position to "venturi fully shut" position. The unstable vane and pressure reverser triggers and changes position at an exact predetermined angle of attack.

The structure and effect of the control means illustrated in Figure 10 is similar to the one shown in Figure 1 but faces in opposite direction relative to the airstream and works in reversed order. A combined support structure and conduit 130b is disposed on an aircraft in the general direction of the airstream and a conduit end 130 opens on the lee-side thereof. A vane blade 131 is loosely and pivotally mounted inside the conduit with a shoulder rivet 132. The oscillable vane 131 protrudes from the conduit to within the airstream. A pressure reverser 133 is secured to the protruding vane blade adjacent the conduit opening. This pressure reverser 133 is adapted to cover and uncover the conduit opening 130 upon oscillation with the coupled vane in accordance with direction changes of the airstream. In Figure 10 the vane and pressure reverser is shown in "covered" and "up" position. The vane travel is limited by contact of the vane blade with the top and bottom inside of the conduit tube. A pressure induction face of the pressure reverser forms an air-scoop 134 protruding transversely from one side of the vane blade and extending to within the airstream.

Positive air pressure is induced by the airstream in the zone 135 adjacent the air-scoop face of the pressure reverser. The conduit orifice 130 is positioned within this zone of positive pressure when covered by the pressure reverser 133. Positive pressure consequently is also induced in the conduit 130b. When the vane 131 and pressure reverser 133 is in uncovered position then the uncovered conduit opening 130 is exposed to the suction of the passing airstream and negative pressure is consequently induced in the conduit. A combined pressure zone separator and airflow barrier 136 extends from the vane and pressure reverser and slip fits along the outer conduit sides adjacent the open conduit end 130. An aircraft apparatus (not shown) responsive to the pressure changes and pressure reversal is fluid connected with the conduit 130b for operation in accordance with direction changes of the airstream.

Figure 11 illustrates another modified form of control means. A support structure 140 fixed to an aircraft has a conduit 141, 141b rigidly mounted to the structure. A venturi duct 142 disposed on the structure has a narrow throat 143 positioned within and generally in line with the airstream flowing about the aircraft during flight. A vane 144 pivotally mounted to the structure on one end 145 thereof has an oscillable vane portion 144 positioned within said airstream. A combined pressure reverser and valve 146 is secured to an oscillable vane portion with a bracket 147 and adapted to open and shut the back end of the venturi duct 142. As is well known, negative fluid pressure is induced in a venturi duct in a zone adjacent the venturi throat by the accelerated rate of air passage. One end 141 of the fluid conduit is connected with said venturi throat 143 and zone of negative pressure. Negative fluid pressure is therefore induced in the conduit 141 when the venturi duct is open to air passage from the airstream. When the back end of the venturi duct 142 is shut by said pressure reverser and valve 146 then the airstream flowing against the open front end 147 of the venturi duct induces positive pressure therein and in the conduit. The combined pressure reverser and valve 146 can also locate between the two described limit positions. It can gradually open and shut the back end of the venturi duct 142 and so gradually free and obstruct air passage therethrough which in turn effects gradual pressure change and pressure reversal in the conduit in accordance with direction changes of the airstream. An aircraft apparatus (not shown) responsive to pressure changes and pressure reversal is fluid connected with the conduit 141b for operation in accordance with direction changes of the airstream.

While I have described the preferred embodiments of my invention, it will be obvious to those skilled in the art after understanding my invention, that various changes and modifications may be made therein without departing from the spirit and scope thereof. For example: Fluid passage from the positive conduit to the negative conduit can be used to control and operate a rotary fluid motor, such as an air turbine. One portion of the fluid conduit can be airtightly separated from the other portion by a flexible conduit member responsive to air pressure, to keep moisture out of the sealed off conduit portion. For example, a low portion of the conduit may be filled with a liquid. For purpose of simple illustration I have described most embodiments of my invention in the same position: facing the airstream. It is understood that the structure may be mounted in reversed position on any type of aircraft whereby the airstream induced motive power is reversed from positive to negative relative to described positions of the structure members. I aim in the appended claims to cover such modifications to the best of my ability.

What I claim is:

1. In aircraft, a conduit being open at both ends, one end of said conduit opening to the influence of the airstream in a position whereby airflow and air pressure is induced therein, a valve associated with said conduit and adapted to control the airflow and fluid pressure therein, a control vane, operative connection between said valve and vane, the position of said valve being responsive to the position of said vane responsive to pressure of the airstream, a member movable longitudinally within the other end of said conduit responsive to airflow and fluid pressure changes therein, and said member being conspicuously visible to the aircraft crew when positioned at said other end of the conduit.

2. In aircraft, a conduit being open at both ends, one end of said conduit opening to the influence of the airstream in a position whereby airflow and air pressure is induced therein, a valve associated with said conduit and adapted to control the airflow and fluid pressure therein, a control vane, operative connection between said valve and vane, the position of said valve being responsive to the position of said vane responsive to the pressure of the airstream, a member movable longitudinally within the other end of said conduit responsive to airflow and fluid pressure changes therein, said member having two limit positions, signalling means associated with said member and being conspicuously visible to the aircraft crew when said member is in one of said limit positions.

3. In aircraft, a conduit, a conduit-orifice on one end of said conduit opening to the airstream in a position whereby air pressure and airflow is induced therein, a pressure reverser being positioned in the airstream outside said conduit near said conduit-orifice, the body of said pressure reverser being bigger than said orifice and having an air-pressure induction means adapted to induce pressure different than atmospheric in a zone on said reverser when the airstream flows about said reverser during flight, said pressure reverser being adapted to cover and uncover said conduit-orifice, vane means exposed to the influence of the airstream and responsive to the pressure thereof, said vane means being associated with said pressure reverser and with said conduit-orifice, the relative position of the reverser and orifice being determined by the position of said vane means, pressure different than atmospheric and airflow in one direction being induced by the airstream at said conduit-orifice when said orifice is not covered by said reverser, pressure different than atmospheric and reversed relative to said pressure at said uncovered conduit-orifice being induced by the air-stream at said pressure induction means and into said zone on said pressure reverser, said conduit-orifice being positioned within and fluid connected with said reversed pressure in said zone when covered by said pressure reverser whereby the air pressure and the airflow direction in said conduit is reversed, and an aircraft apparatus comprising a fluid motor fluid connected with the other end of said conduit, said fluid motor having a movable motor-member operated in opposite direction responsive to airflow reversal and pressure reversal in said conduit, and movable parts of said apparatus being operatively connected with said motor-member for reciprocatory motion therewith.

4. A fluid pressure generator and control means for a fluid connected aircraft apparatus comprising a control conduit, a conduit-orifice on one end of said conduit opening to the airstream in a position whereby air pressure and airflow is induced therein, a pressure reverser being positioned in the airstream outside said conduit near said conduit-orifice, the body of said pressure reverser being bigger than said orifice and having an air-pressure induction means adapted to induce pressure different than atmospheric in a zone on said reverser when the airstream flows about said reverser during flight, said pressure reverser being adapted to cover and uncover said conduit-orifice, vane means exposed to the influence of the airstream and responsive to the pressure thereof, said vane means being associated with said pressure reverser and with said conduit-orifice, the relative position of the reverser and orifice being determined by the position of said vane means, pressure different than atmospheric and airflow in one direction being induced by the airstream at said conduit-orifice when said orifice is not covered by said reverser, pressure different than atmospheric and reversed relative to said pressure to said uncovered conduit-orifice being induced by the airstream at said pressure induction means and into said zone on said pressure reverser, said conduit-orifice being positioned within and fluid connected with said reversed pressure in said zone when covered by said pressure reverser whereby the airstream induced fluid pressure and airflow direction in the control conduit for said controlled fluid connected apparatus is reversed in accordance with the position of said pressure reverser and vane.

5. The combination as set forth in claim 4 wherein a venturi-duct having a throat is exposed to the airstream in general alignment therewith and wherein said conduit-orifice opens into the venturi-throat, said pressure reverses forming part of the venturi-throat when in that position in which the reverser covers the conduit-orifice, said pressure induction means on the reverser being influenced by the increased air-velocity in the venturi-throat when the reverser is in the last said position, whereby the reversed non-atmospheric pressure in said zone on the reverser and in the covered conduit-orifice is boosted.

6. The combination as set forth in claim 4 wherein a venturi-duct having a throat is exposed to the airstream in general alignment therewith, and wherein said conduit-orifice opens into the throat of said venturi-duct, said pressure reverser forming part of the venturi-throat when in that position in which the reverser covers the conduit-orifice and being adapted to increase and decrease the venturi-throat opening by the reciprocatory motion of the reverser in accordance with the reciprocatory motion of said vane means.

7. In aircraft, a pair of conduits, a conduit-orifice on one end of each conduit opening into the airstream in a position whereby about equal air pressure different than atmospheric is induced therein, a pressure reverser being positioned in the airstream outside said conduits near one of said conduit-orifices, the body of said pressure reverser being bigger than said one respective conduit-orifice and having an air-pressure induction means adapted to induce pressure different than atmospheric in a zone on said reverser when the airstream flows about said reverser during flight, said pressure reverser being adapted to cover and uncover said one conduit-orifice, vane means exposed to the influence of the airstream and responsive to the pressure thereof, said vane means associated with said pressure reverser and with said one conduit-orifice, the relative position of the reverser and said one conduit-orifice being determined by the position of said vane means, pressure different than atmospheric and reversed relative to said equal pressure at said uncovered conduit-orifices being induced by the airstream at said pressure induction means and into said zone on said pressure reverser, said one conduit-orifice being positioned within and fluid connected with said reversed pressure in said zone when covered by said pressure reverser whereby the air pressure in said one conduit is reversed, and a fluid motor fluid connected with the other ends of said pair of conduits having a movable member responsive to pressure difference in the conduits, an aircraft apparatus having a movable part operatively connected with said motor-member for operation thereof by the pressure induced by the airstream in accordance with the position of said vane and reverser.

8. A fluid pressure generator and control means for a fluid connected aircraft apparatus comprising, a pair of control conduits, a conduit-orifice on one end of each conduit, the conduit-orifices being positioned adjacent to each other and opening into the airstream in a position whereby about equal air pressure different than atmospheric is induced therein, a single pressure reverser being positioned in the airstream outside said conduits near said conduit-orifices, the body of said pressure reverser being bigger than either one of said conduit-orifices and having an air-pressure induction means adapted to induce pressure different than atmospheric in a zone on said reverser when the airstream flows about said reverser during flight, said pressure reverser being adapted to cover and uncover said two conduit-orifices, vane means responsive to the pressure of the airstream associated with said pressure reverser and with said conduit orifices, the relative position of the reverser and conduit-orifices being determined by the position of said vane means, said reverser and said conduit-orifices being arranged so that the reverser uncovers one of said conduit-orifices while covering the other one, pressure different than atmospheric and reversed relative to the pressure at an uncovered conduit-orifice being induced by the airstream at said pressure induction means and into said zone on the pressure reverser, each of said conduit-orifices while covered by said pressure reverser being positioned within and fluid connected with said reversed pressure in said zone, whereby the airstream induced pressure difference and airflow in the control conduits for said controlled fluid connected apparatus changes in accordance with the position of said pressure reverser and vane.

9. The combination as set forth in claim 8 wherein a pressure separator is interposed between the conduit-orifices, said pressure separator being adapted to obstruct pressure bleeding between conduit-orifices from the positive to the negative pressure zone.

10. An aircraft apparatus comprising a power generator and a control means as set forth in claim 8 and being further characterized in that a movable attitude control surface of the aircraft is automatically operated by the motive power induced by the airstream at said conduit-orifices, and wherein a fluid motor is fluid connected with said other ends of the conduits, said fluid motor having a movable motor member operated in opposite direction responsive to airflow reversal and pressure reversal in said conduits, operative connection between said motor-member and said control surface for operation thereof by corrective pressure transmitted from said motor in accordance with the off-neutral position of said vane means and reverser for returning the aircraft to the attitude in which the angle of attack of the airstream re-aligns said vane means and reverser in neutral position.

11. A fluid pressure generator and control means for a fluid connected aircraft apparatus comprising, a plurality of control-conduits, a conduit-orifice on one end of each conduit, the conduit-orifices being positioned adjacent to each other and aligned in one plane, said conduit-orifices opening into the airstream in a position whereby about equal air pressure different than atmospheric is induced therein, a single pressure reverser being positioned in the airstream outside said conduits near said conduit-orifices, the body of said pressure reverser being bigger than any one of said conduit-orifices and having an air pressure induction means adapted to induce pressure different than atmospheric in a zone on said reverser when the airstream flows about said reverser during flight, said pressure reverser being adapted to cover any one of said conduit-orifices, vane means responsive to the pressure of the airstream associated with said pressure reverser and with said conduit-orifices, said vane means being adapted to move in a plane parallel with the aligned conduit-orifices, the relative position of the pressure reverser and conduit-orifices being determined by the position of said vane means, said conduit-orifices being arranged to be covered by the pressure reverser in different vane positions, pressure different than atmospheric and reversed relative to the pressure at an uncovered conduit-orifice being induced by the airstream at said pressure induction means and into said zone on the pressure reverser, the conduit-orifice which is covered by the pressure reverser being positioned within and fluid connected with said reversed pressure in said zone, whereby the nonatmospheric pressure in the covered conduit is reversed, and whereby the airstream induced pressure difference and airflow in the control conduits for said controlled fluid connected apparatus changes in accordance with the position of said pressure reverser and vane.

12. The combination as set forth in claim 11 wherein a pressure separator is interposed between conduit-orifices, said pressure separator being adapted to obstruct pressure bleeding between conduit-orifices from the positive to the negative pressure zone.

13. The combination as set forth in claim 11 wherein movable signaling members are associated with the conduit-ends opposite said conduit-orifices, each signaling member having two limit positions in accordance with the non-atmospheric pressure and direction of airflow in the respective conduit, the member associated with the conduit which has the reversed pressure and reversed airflow being in a different limit position than the other members, and signaling means associated with the member in the different position being conspicuously visible to the aircraft crew.

14. The combination as set forth in claim 11 wherein each conduit has a member in the conduit-end opposite said conduit-orifice, each member being movable longitudinally in the respective conduit responsive to airflow and pressure reversal therein, each member having two limit positions, signaling means associated with each member being conspicuously visible to the aircraft crew when a member is in one of said limit positions.

15. In aircraft, a conduit open at both ends, a conduit-orifice on one end of said conduit opening to the airstream in a position whereby air pressure and airflow is induced therein, a pressure reverser being positioned in the airstream outside said conduit near said conduit-orifice, the body of said pressure reverser being bigger than said orifice and having an air pressure induction means adapted to induce pressure different than atmospheric in a zone on said reverser when the airstream flows about said reverser during flight, said pressure reverser being adapted to cover and uncover said conduit-orifice, vane means exposed to the influence of the airstream and responsive to the pressure thereof, said vane means being associated with said pressure reverser and with said conduit-orifice, the relative position of the reverse and conduit-orifice being determined by the position of said vane means, pressure different than atmospheric and airflow in one direction being induced by the airstream at said conduit-orifice when said orifice is not covered by said reverser, pressure different than atmospheric and reversed relative to said pressure at said uncovered conduit-orifice being induced by the airstream at said pressure induction means and into said zone on said pressure reverser, said conduit-orifice being positioned within and fluid connected with said reversed pressure in said zone when covered by said pressure reverser, whereby the air pressure and the airflow direction in said conduit is reversed, a member being contained within the other end of the conduit and movable longitudinally therein responsive to airflow reversal and pressure reversal in the conduit, said member having two limit positions in accordance with the direction of airflow and pressure in the conduit, and signaling means associated with said member being conspicuously visible to the aircraft crew when said member is in one of said two positions.

16. A fluid pressure generator and control means for a fluid connected aircraft apparatus comprising a control-conduit, a conduit-orifice on one end of said conduit, a vane, one end of the vane being pivotally mounted within the conduit, the opposite end portion of the vane protruding beyond the conduit-orifice into the influence of the airstream flowing about the aircraft during flight, a pressure reverser mounted on said vane outside the conduit near the conduit-orifice, the body of said pressure reverser being bigger than said orifice and having an air pressure induction means adapted to induce pressure different than atmospheric in a zone on said reverse when the airstream flows about said reverser, said pressure reverser being adapted to cover and uncover said conduit-orifice in accordance with the position of the vane in accordance with the pressure of the airstream, pressure different that atmospheric and airflow in one direction being induced by the airstream at said conduit-orifice when said orifice is not covered by said reverser, pressure different than atmospheric and reversed relative to said pressure at said uncovered conduit-orifice being induced by the airstream at said pressure induction means into a zone on said pressure reverser, said conduit-orifice being positioned within and fluid connected with said reversed pressure in said zone when covered by the reverser, whereby the air pressure and the airflow direction in said conduit is reversed, and whereby the airstream induced pressure and airflow in the control-conduit for said controlled fluid connected apparatus changes in accordance with the position of said reverser and vane.

17. A fluid pressure generator and control means for a fluid connected aircraft apparatus comprising, an air-duct open at opposite ends, the duct-ends opening into the influence of the airstream in general alignment with the latter, a valve associated with said duct being adapted to control the airflow therethrough, a vane means exposed to the influence of the airstream and responsive to pressure thereof, said vane means being associated with said valve and duct, the relative position of the valve and duct being determined by the position of the vane means, a control-conduit fluid connecting said air-duct with the controlled aircraft apparatus, one conduit-end opening into said duct intermediate the duct-ends, said valve being adapted to oscillate between two valve positions to increase and decrease the air-passage capacity of said duct, whereby the airstream induced fluid pressure in the control conduit for said controlled fluid connected apparatus changes in accordance with the position of said vane and valve.

18. The combination as set forth in claim 17 wherein said duct forms a venturi-throat where the conduit-end opens into the duct.

19. The combination as set forth in claim 17 wherein said valve is adapted to cover and uncover the back-end of said duct.

20. A fluid pressure generator and control means for a fluid connected aircraft apparatus comprising, an air-duct open at opposite ends, the duct-ends opening into the influence of the airstream in general alignment with the latter, a valve associated with said duct being adapted to control the airflow therethrough, a vane means exposed to the influence of the airstream and responsive to pressure thereof, said vane means being associated with said valve and duct, the relative position of the valve and duct being determined by the position of the vane means, a control-conduit fluid connecting said air-duct with the controlled aircraft apparatus, one conduit-end opening into said duct intermediate the duct-ends through an air passageway positioned transverse to the duct-wall, said valve being adapted to oscillate between two valve positions to increase and decrease the air-passage capacity of said duct, negative fluid pressure being induced in said passageway and conduit-end by the air-stream flowing through said duct when the valve is in one of said two positions, positive pressure being induced in said conduit-end by the impact of the airstream against the front end of the duct when said valve is in the other one of said two positions, whereby the fluid pressure in the control conduit for said controlled fluid connected apparatus is reversed in accordance with the position of said vane and valve.

21. The combination as set forth in claim 20 wherein said duct forms a venturi-throat where the air passageway and conduit-end opens into the duct.

22. The combination as set forth in claim 20 wherein said valve is adapted to cover and uncover the back-end of said duct.

23. In control means for an aircraft apparatus operated by motive power induced by the airstream, a conduit, one conduit end opening within the influence of the airstream in a position whereby air pressure and airflow is induced therein, a pressure reverser exposed to the airstream and adapted to cover and uncover said conduit-opening, vane means exposed to the influence of the airstream and responsive to the angle of attack, said vane means associated with said pressure reverser and with said open conduit end for controlling the relative position thereof, said conduit-opening covered by said pressure reverser when the angle of attack is on one side of a selected angle and uncovered when the angle of attack is on the other side of said selected angle, pressure different than atmospheric and airflow in one direction being induced by the airstream at said conduit opening when said opening is not covered by said reverser, pressure different than atmospheric and reversed relative to said pressure at said uncovered conduit-opening being induced by the airstream in a zone on said pressure reverser, said conduit-opening being positioned within and fluid connected with said reversed pressure in said zone when covered by said pressure reverser whereby the air pressure and the airflow direction in said conduit is reversed, and said aircraft apparatus comprising a fluid motor fluid connected with the other end of the conduit, said fluid motor having a movable member operated in opposite direction responsive to airflow reversal and pressure reversal in said conduit, parts of said apparatus operatively connected with said motor member for reciprocatory motion therewith.

24. In control means for an aircraft apparatus operated by air pressure greater and less than atmospheric and by reversed airflow induced by the airstream, a plurality of conduits, one end of each conduit opening within the influence of the airstream in a position whereby generally equal air pressure different than atmospheric is induced therein, a single pressure reverser exposed to the airstream and adapted to cover any one of said conduit openings, vane means responsive to angle of attack associated with said pressure reverser and with said conduit openings, each of said conduit openings arranged to be covered by said reverser in a different selected reverser position responsive to different corresponding angles of attack, pressure different than atmospheric and reversed relative to said pressure at said uncovered conduit openings being induced by the airstream in a zone on said pressure reverser, each of said conduit openings while covered by said pressure reverser positioned within and fluid connected with said reversed pressure in said zone whereby the airstream induced pressure and the direction of airflow in the covered conduit is reversed, and said aircraft apparatus fluid connected with the other ends of said conduits comprising movable signaling members disposed in said other ends of each conduit and responsive to airflow reversal and pressure reversal therein, each member having two limit positions in accordance with the direction of airflow in the fluid connected conduit, and signaling means associated with each member being conspicuously visible to the aircraft crew when a member is in one of said two positions.

References Cited in the file of this patent

UNITED STATES PATENTS

| | | |
|---|---|---|
| 1,119,324 | Spater | Dec. 1, 1914 |
| 1,367,839 | Tarbox | Feb. 8, 1921 |
| 1,623,121 | Kettering | Apr. 5, 1927 |
| 1,956,755 | Constantin | May 1, 1934 |
| 1,972,336 | Gardner | Sept. 4, 1934 |
| 2,061,078 | Lacoe | Nov. 17, 1936 |
| 2,343,288 | Fink | Mar. 7, 1944 |
| 2,499,284 | Smith | Feb. 28, 1950 |
| 2,542,202 | McGuire | Feb. 20, 1951 |
| 2,552,075 | Van Daam | May 8, 1951 |
| 2,559,817 | Ashkenas | July 10, 1951 |